Dec. 1, 1936. W. L. WETTLAUFER 2,062,343
POWER TRANSMITTING MECHANISM
Filed June 20, 1935   2 Sheets-Sheet 1
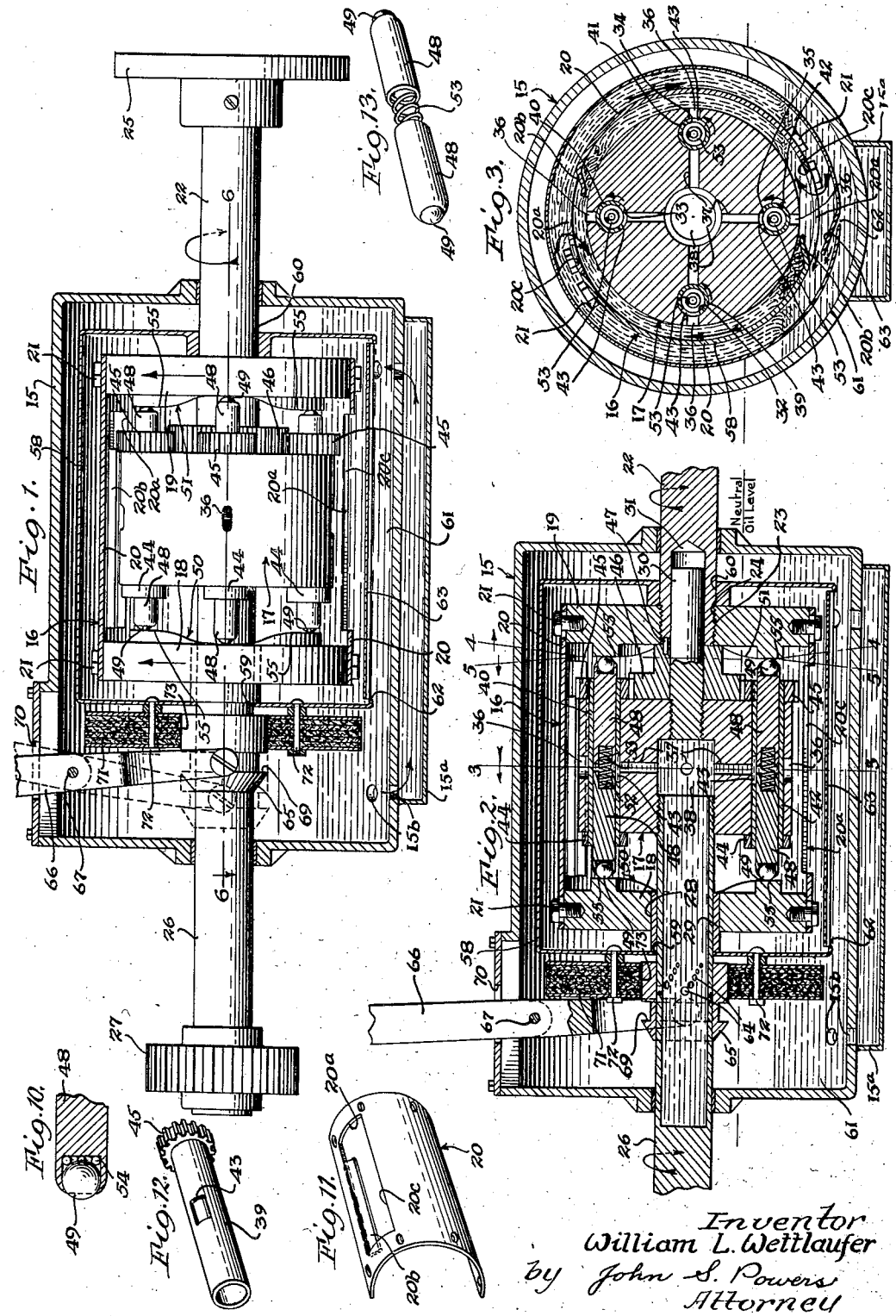
Inventor
William L. Wettlaufer
by John S. Powers
Attorney Dec. 1, 1936.  W. L. WETTLAUFER  2,062,343
POWER TRANSMITTING MECHANISM
Filed June 20, 1935  2 Sheets-Sheet 2
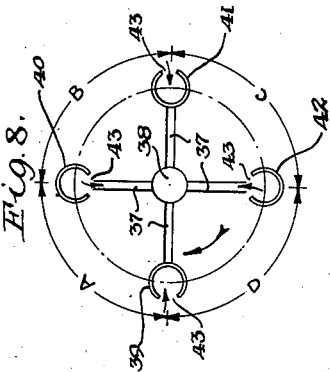
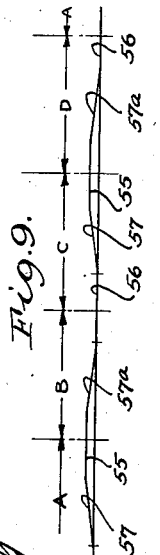
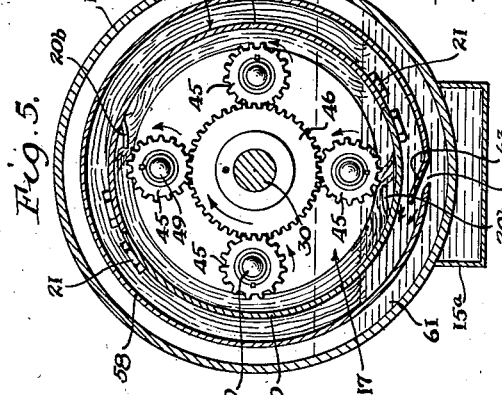
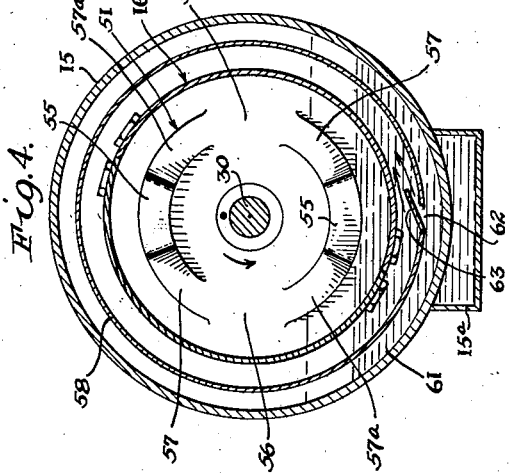
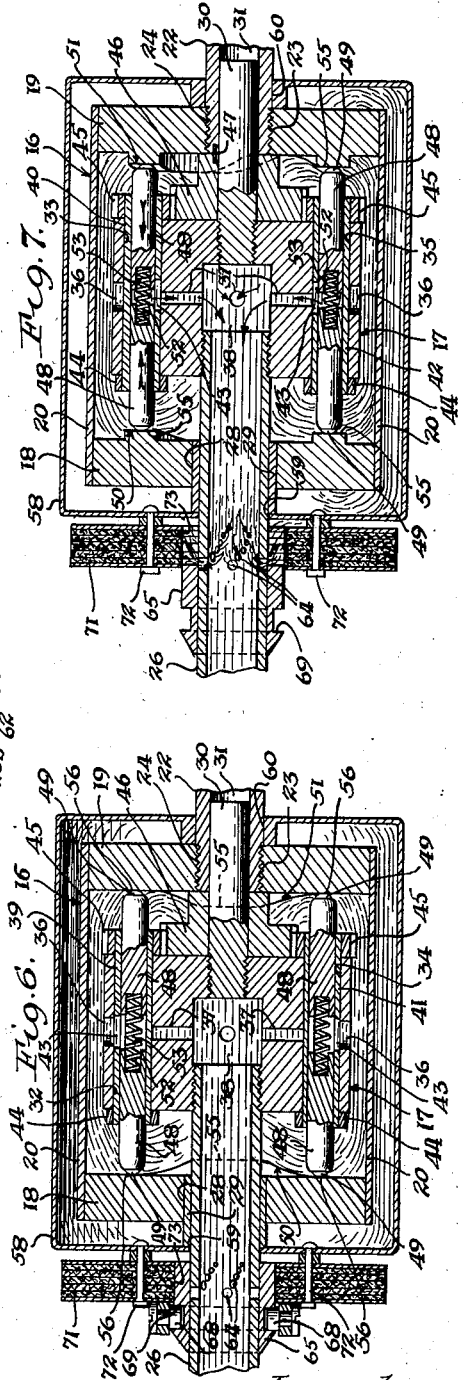
Inventor
William L. Wettlaufer
by John S. Powers
Attorney Patented Dec. 1, 1936

2,062,343

UNITED STATES PATENT OFFICE 2,062,343

POWER TRANSMITTING MECHANISM

William L. Wettlaufer, Buffalo, N. Y.

Application June 20, 1935, Serial No. 27,559

22 Claims. (Cl. 192—59)

This invention relates to improvements in power transmission mechanisms of the kind which utilize a fluid as the medium through which the movement of the driving member is imparted to the driven member and more particularly the invention is concerned with a mechanism in which one of said members carries a plurality of pistons which are operated by the relative movement of the companion member to cause the fluid to circulate in a prescribed path, the desired speed ratio between the driving and driven members being effected by regulating the rate of flow of the fluid in said path.

One object of the invention is to provide a mechanism in which the desired speed ratio between the driving and driven members may be effected and maintained, this object contemplating a construction in which provision is made for replacing automatically and substantially instantaneously any of the fluid under pressure which may escape as a result of leakage.

A further object is to provide a mechanism in which the various forces which are set up as an incident to the transmission of power from the driving member to the driven member are counterbalanced or equalized.

A still further object is a mechanism in which provision is made for causing the fluid to circulate under pressure over the intake ports to the bore or cylinders in which the pistons are arranged, whereby to insure the introduction of the fluid, in adequate amounts, into the said bores or cylinder.

A still further object is to provide a mechanism which is economical from a standpoint of the amount of fluid which is required in the transmission of power from the driving member to the driven member.

A still further object is to provide a mechanism which is so designed that loss of the fluid from leakage is substantially prevented.

A still further object is a novel design and arrangement of the parts of the mechanism, whereby simplicity and economy in construction are obtained.

The invention is illustrated in the accompanying drawings in which:

Figure 1 is a vertical longitudinal section through a mechanism embodying features of the invention, certain of the parts of said mechanism being shown in elevation.

Figure 2 is a similar view in which certain of those parts shown in elevation in Figure 1 are illustrated in section.

Figures 3, 4 and 5 are vertical transverse sections taken along lines 3—3, 4—4 and 5—5, respectively, of Figure 2.

Figure 6 is a horizontal section taken along line 6—6 of Figure 1.

Figure 7 is a longitudinal section through the mechanism and is taken at right angles with respect to the section illustrated in Figure 6.

Figure 8 is a diagrammatic view illustrating the movement of the valves which control the intake ports to the bores or cylinders in which the pistons work.

Figure 9 is a diagrammatic view illustrating the contour of the cams which operate the pistons.

Figure 10 is a fragmentary sectional view of one of the pistons.

Figure 11 is a perspective view of a body section of the driving member of the mechanism.

Figure 12 is a perspective view of one of the valves which control the intake ports of the bores or cylinders.

Figure 13 is an enlarged perspective view of a co-operating pair of the pistons and shows the spring by which the said pistons are moved away from one another.

The mechanism, as illustrated, is arranged in a suitable housing 15 and includes driving and driven members 16 and 17, respectively. The former comprises discs 18 and 19 and a pair of semi-cylindrical sections 20, the said discs and sections being secured together by suitable bolts 21 to provide a hollow body which is co-axial with the member 17. Openings 20a are formed in the sections 20 and are located at opposite sides of the said body, the metal along one of the longitudinal edges of each of the openings 20a being bent inwardly toward the driven member 17 to provide a deflector 20b while the metal along the opposite side of each of the said openings is formed to provide a beveled edge 20c. Preferably the openings in the sections 20 through which the bolts 21 pass are elongated as best shown in Figure 2 in order that the discs may may be adjusted toward and away from one another as circumstances may require. The driving member 16 is adapted to be connected to a prime mover such as, for example, the engine of an automobile. To this end it is provided with a shaft 22 which is formed at its inner end with a threaded extension 23, the said extension being screwed into a threaded opening 24 formed at the center of the disc 19. At its outer end the said shaft carries a suitable coupling 25 which is available for connecting it to the prime mover, it being noted that the threads upon the extension 23 and those within the opening 24 are so formed that rotation of the shaft 22 by the prime mover tends to lock it and the disc 19 against relative angular movement.

The driven member 17 is secured to a shaft 26 which carries a gear 27 or any suitable coupling for connecting it to the mechanism to be driven. The shaft 26 passes through an opening 28 which is formed centrally of the disc 18 and it carries a bushing or bearing 29, the said bushing or bearing fitting in the opening 28 and being adapted to permit free relative movement between the shaft 26 and the driven member 17. The driven member 17 carries a spindle 30 (Figure 2) which fits in a socket 31 formed in the end of the shaft 22. It is formed with a circular series of bores 32, 33, 34 and 35 (Figure 3) which have intake ports 36 and which communicate with radially extending ducts 37, the said ducts leading to a central chamber 38. Sleeves 39, 40, 41 and 42, respectively, are arranged in the bores 32, 33, 34 and 35. The said sleeves are rotatably mounted in their respective bores and each is formed with a port 43 which is adapted to register, in one position of the sleeve, with an intake port 36 and, in a second position of the sleeve, with a duct 37. The sleeves 39, 40, 41 and 42 extend beyond the ends of the member 17. They carry collars 44 at one end and gears 45 at the opposite end. The said gears 45 are fixed to their respective sleeves and they mesh with a gear 46 which is loosely mounted upon the spindle 30, the gear 46 being keyed to the extension of the shaft 22 by a pin 47. It will be apparent that the gear 46 will be caused to rotate with the driving member 16 and that as the said member rotates relatively to the driven member 17 the sleeves 39, 40, 41 and 42 will be caused to rotate, whereby the ports 43 of the said sleeves are moved to register successively with the intake ports 36 and the ducts 37.

A pair of opposed pistons 48 is arranged in each of the sleeves 39, 40, 41 and 42. The said pistons carry balls 49 which are adapted to maintain a rolling contact with cams 50 and 51 which are formed or provided upon the discs 18 and 19, respectively, one of the pistons in each pair co-operating with one of the said cams and the other piston of the said pair co-operating with the other cam. The pistons 48 are formed at their inner ends with sockets 52 which are adapted to accommodate springs 53. Each of the latter is under compression and serves to hold the balls 49 of the associated pair of pistons in contact with the cams 50 and 51, whereby they are caused to follow the said cams during relative angular movement between the driving and driven members. In order to reduce friction to a minimum each of the balls 49 is preferably employed in connection with a race of smaller bearings 54 (Figure 10), it being understood that any other suitable means may be employed for this purpose.

The cams 50 and 51 are similar in contour. Each includes diametrically opposed substantially flat peak portions 55 (Figures 4 and 9) and diametrically opposed substantially flat low portions 56, the said peak and low portions being connected by angularly inclined portions 57 and 57a. The discs 18 and 19 are so arranged relatively to one another that the pistons in each bore co-operate with similar portions of their respective cams. It will be apparent, therefore, that as the driving member 16 rotates relatively to the driven member 17 the pistons in each bore will be moved simultaneously toward one another as the inclined portions 57 of the cams 50 and 51 move beneath the associated balls 49, the said pistons remaining at the inner limits of their ranges of movement as the peak portions 55 of the cams move beneath the said balls. As the said peak portions move beyond the balls 49 and the latter follow the inclined portions 57a, the springs 53 move the pistons 48 away from one another until the low portions 56 of the cams engage the said balls. During engagement of the balls 49 by the low portions of the cams the pistons 48 remain at the outer limits of their ranges of movement. In this connection it will be noted that the contour of the cams 50 and 51 is such that when the pistons in two of the bores are held at the inner limits of their ranges of movement the pistons in the remaining two bores are held at the outer limits of their ranges of movement. Hence as the driving member 16 rotates relatively to the driven member 17 the pistons in two of the bores will be moved away from one another while the pistons in the remaining two bores will be moved toward one another, it being noted that the bores in which the pistons are moving away from one another are diametrically opposed as are the bores in which the pistons are moving toward one another and that the four bores are arranged symmetrically in the driven member with an angular distance of substantially 90° between adjacent bores.

The rotation of the sleeves 39, 40, 41 and 42 is so timed that the ports 43 register with the intake ports 36 when the pistons are moving away from one another and with the ducts 37 when the said pistons are moving toward one another. Referring to Figure 6, it will be noted that the ports 43 of the sleeves 39 and 41 register with the associated intake ports 36 and that the pistons in the said sleeves co-operate with the low portions 56 of the cams 50 and 51, the said pistons being at the outer limits of their ranges of movement. When the sleeves 39 and 41 occupy the positions described the sleeves 40 and 42 (Figure 7) occupy positions in which their ports 43 register with the associated ducts 37 and the pistons in the said sleeves co-operate with the peak portions 55 of the cams 50 and 51, the said pistons being at the inner limits of their ranges of movement.

It will be apparent, therefore, that as the driving member 16 rotates relatively to the driven member 17, the peak portions of the cams 50 and 51 will approach the pistons which occupy the bores 32 and 34, the sleeves 39 and 41 rotating during this period to move their ports 43 out of registration with the associated intake ports 36 and into registration with the associated ducts 37. The timing of the sleeve movements is such that the ports 43 move into registration with the said ducts 37 just as the inclined portions 57 of the cams engage the pistons. The ports 43 of the sleeves will, therefore, register with the ducts 37 as the pistons move toward one another. At the beginning of the series of movements just described in connection with the pistons in the bores 32 and 34, the pistons in the bores 33 and 35 (Figure 7) are engaged by the peak portions of the cams and the sleeves 40 and 42 occupy positions in which their ports 43 register with the associated ducts 37. As the peak portions of the cams move by the pistons the sleeves 40 and 42 rotate to move their ports 43 out of registration with the associated ducts 37 and into registration with the associated intake ports 36, the timing of the sleeve movements being such that the ports 43 are moved into registration with the said intake ports just as the peak portions of the cams move beyond the pistons. The ports 43 of the sleeves will, therefore, register with the intake ports 36 as the pistons move away from one another.

In the embodiment illustrated the driving member 16 is arranged in, and is co-axial with, a cylindrical shell 58, one end of the said shell being formed with an opening 59 to accommodate the shaft 26 while the opposite end of the shell is formed with an opening 60 to accommodate the shaft 22. The shell 58 is suitably secured within the housing 15 and is partially immersed in a suitable fluid medium 61, the quantity of the said medium preferably being such that its level will, at all times, be well below the openings in the housing 15 through which the shafts 22 and 26 pass. Preferably a sump 15a (Figure 1) is employed in connection with the housing 15, the said sump providing an auxiliary reservoir in which cooling of the fluid medium is facilitated. Circulation of the fluid medium is induced to a certain degree by the agitation of the body of fluid medium in the housing 15 during rotation of the driving and driven members. Suitable holes 15b are formed in the bottom of the housing 15 to permit circulation of the fluid medium through the said sump. A longitudinally extending slot 62 (Figure 3) is formed in the shell 58 at a point below the level of the fluid medium 61, whereby to enable the said fluid medium to enter the shell. The said slot is shielded by a deflector 63 which overlies it and which is angularly inclined in the direction of rotation of the driving member 16.

It will be apparent that as the driving member 16 rotates the openings 20a will pass beneath the surface of the fluid medium in the shell 58, thereby permitting the said fluid medium to enter the said openings as best shown in Figure 3. The fluid medium which enters the openings 20a will be carried around with the driving member 16 in the annular space between the body of the driving member and the driven member, it being noted that the beveled edges 20c of the openings 20a are formed to cut into the fluid medium and direct it into the space between the driving and driven members while the angle of inclination of the deflectors 20b is such that the fluid medium in the said space is forced against the driven member.

A portion of the fluid medium which enters the shell 58 will, owing to its frictional engagement with the outer surface of the driving member, be carried around in the annular space between the driving member and the shell 58. The deflector 63 directs the fluid medium over the slot 62 and inwardly toward the driving member. The passage of the fluid medium over the slot 62 in this manner creates a suction effect along the said slot and facilitates entry of the fluid medium into the shell 58, the deflector 63 serving the additional purpose of preventing the discharge of the fluid medium through the said slot as a result of centrifugal force. From the foregoing it will be apparent that upon rotation of the driving member 16 the fluid medium in the housing 15 is caused to enter the shell 58 until the annular spaces between it and the driving member and between the driving member and the driven member are completely filled, the body of fluid medium thus created circulating in the direction of rotation of the driving member. The body of the driving member divides the circulating body of the fluid medium into inner and outer layers, the edges 20c of the openings 20a directing the fluid medium in the outer layer toward the inner layer while the deflectors 20b direct the fluid medium in the inner layer against the driven member 17. The fluid medium is, therefore, forced under pressure into the intake ports 36. The construction described has the advantage that splashing of the fluid medium in the housing is prevented. As the level of the fluid medium is always below the openings in the housing through which the shafts 22 and 26 pass any leakage of the fluid medium through such openings can be easily prevented. In this connection it is to be understood that, if desired, the driven member 17 may be completely immersed in the fluid medium, thereby rendering the shell 58 unnecessary. If the said shell is eliminated, splashing of the fluid medium may be prevented in any suitable manner.

It will be apparent that as the driving member 16 is rotated by the prime mover a portion of the fluid medium in the housing 15 will be caused to circulate around the driven member 17, the level of the fluid medium in the housing falling until the annular spaces between the shell 58 and the driving member, and the driving member and the driven member are completely filled. At the same time the sleeves 39, 40, 41 and 42 are revolved so that their ports 43 register with the intake ports 36 during movement of the pistons away from one another so that the said pistons draw charges of the fluid medium into their respective bores. Prior to the movement of the pistons toward one another, the sleeves revolve so that the ports 43 are moved to register with the ducts 37. Hence as the pistons move toward one another the charges of the fluid medium are forced through the ducts 37 into the chamber 38, it being noted that the mechanism is so designed that two diametrically opposed pairs of pistons are drawing in charges of the fluid medium as two diametrically opposed pairs of pistons are forcing charges of the fluid medium into the chamber 38.

Means is provided for regulating the escape of the fluid medium from the chamber 38, whereby to control the relative speed of the driven member 17. For this purpose the inner end of the shaft 26 is in the form of a tube (Figure 2), the said end providing a passage which communicates with the chamber 38 and being formed with graduated openings 64 through which the fluid medium from the said chamber may return to the housing 15. A sleeve 65 is arranged on the shaft 26 for sliding movement over the said openings, the said sleeve being movable to close any desired number of the openings 64 and thereby control the rate at which the fluid medium is permitted to return to the housing. Adjustment of the sleeve 65 along the shaft 26 is effected by a control lever 66 which is pivotally mounted upon a shaft 67, the lower end of the said lever being forked and carrying rollers 68 (Figure 6) which are located at opposite sides of the shaft 26 in an annular groove 69 which is formed in the sleeve. The upper end of the said lever extends through an opening 70 in the housing to provide a suitable handle. The rollers 68 are adapted to permit the sleeve 65 to rotate, in its adjusted position, with the shaft 26. Wearing of the sleeve as a result of relative angular movement between the sleeve and the shaft 26 is, therefore, prevented.

In order to prevent splashing and the mixing of air with the fluid medium as it is discharged through the openings 64, the invention contemplates the use of a series of felt discs 71 (Figure 2) which are secured in a group to an end wall of the shell 58 by bolts 72, the said discs being formed with central openings 73 for accommodating the shaft 26 and the sleeve 65. The discs 71 are spaced apart slightly and are arranged so that they surround that portion of the shaft 26 in which the openings 64 are formed. It will be apparent, therefore, that as the fluid medium discharges through the openings 64 the greater part of it will enter between the discs 71, whereby to reduce the velocity of the jets without permitting them to strike against the walls of the housing and break up in minute particles. It is understood of course that any suitable means may be employed for receiving and reducing the velocity of the jets of the fluid medium.

In the operation of the mechanism, assuming that the sleeve 65 is moved to a position in which all of the openings 64 are uncovered, the fluid medium which is caused to flow into the chamber 38 is permitted to escape through the openings 64 at the same rate that it enters the said chamber. The rotation of the driving member 16 will not, therefore, cause any movement of the driven member 17. On the other hand if the sleeve 65 is adjusted so that certain of the openings 64 are covered then there will be a resistance offered to the flow of the fluid medium from the chamber 38. As a result of such resistance a greater force is required to operate the pistons 48, that is to say to move them toward one another. The resistance which is thus offered by the pistons causes the driving member to move the driven member, the rate at which the driven member revolves relative to the driving member depending upon the amount of resistance which the pistons offer to movement toward one another. As such resistance can be varied by regulating the rate at which the fluid medium is permitted to escape through the openings 64 it will be apparent that the relative speed of the driven member 17 can be regulated by adjusting the sleeve 65 along the shaft 26, it being obvious that by adjusting the sleeve 65 so that it closes all of the openings 64 all of the fluid medium which enters the chamber 38 will be confined therein. Hence when the chamber 38 is filled the fluid medium therein will prevent movement of the pistons toward one another. When movement of the pistons 48 toward one another is prevented the driving and driven member are locked against relative angular movement and they will, therefore, revolve as a single unit, it being understood that relative angular movement between the driving and driven members can only take place when the pistons 48 move inwardly to permit the peak portions 55 of the cams 50 and 51 to pass beneath the balls 49 and that when the said pistons are prevented from moving inwardly such movement of the peak portions of the cams is prevented. In the event that any of the fluid medium escapes by leakage when the driving and driven members are intended to be locked against relative movement, the slight relative movement between the members which results from such leakage will be automatic and instantaneous, thereby actuating the pistons 48 to refill the chamber 38 and relock the said members against relative angular movement.

It will be noted while the pistons in two of the bores 32, 33, 34 and 35 are forcing the fluid medium into the intake chamber 38 the pistons in the other two bores are moving in the direction of their intake strokes. Hence, in the embodiment illustrated only two pairs of the pistons 48 will, at any given time, offer a resistance to relative movement between the driving and driven members. In other words the locking of the driving and driven members against relative movement is effected by two pairs of the pistons 48. Although the particular two pairs of pistons which may lock the driving and driven members is determined by chance and may vary, the pairs of pistons which lock the said members will in all cases be diametrically opposite one another. The thrust forces will, therefore, be balanced and applied to the discs 18 and 19 in such a manner as to counterbalance one another. It will be noted further that the action of the springs 53 may be varied to effect operation of the pistons in the desired manner by adjusting the discs 18 and 19, the adjustability of the said discs having the further advantage that wearing of the parts may be compensated.

Although the mechanism is described as a power transmission, it is to be understood that it may, if desired, be employed in connection with a conventional vehicle transmission, the mechanism in such case serving as a clutch and being available to connect the crankshaft of the prime mover to the driving shaft of the transmission.

I claim as my invention:

1. A mechanism of the character described including a housing, a body of a fluid medium in said housing, a driving member, a driven member, said driven member being at least partially immersed in said fluid medium and having a bore, an outlet passage leading from said bore and an intake port, opposed pistons in said bore, means carried by the said driving member for actuating said pistons, valve means which is operable during suction strokes of said pistons to permit a charge of said fluid medium to enter said bore and which is operable during the exhaust strokes of said pistons to permit said charge to enter said passage and return to said body of fluid medium and means for restricting the flow of the fluid medium from said passage, whereby to cause the driving member to rotate the driven member.

2. A mechanism of the character described including a housing, a body of a fluid medium in said housing, a driving member, a driven member, said driven member being at least partially immersed in said fluid medium and having a bore, an outlet passage leading from said bore and an intake port, opposed pistons in said bore, means carried by the said driving member for actuating said pistons, valve means which is operable as said pistons move away from one another to permit a charge of said fluid medium to enter said bore and which is operable as said pistons move toward one another to permit said charge to enter said passage and return to said body of fluid medium and means for restricting the flow of the fluid medium from said passage, whereby to cause the driving member to rotate the driven member.

3. A mechanism of the character described including a housing, a body of a fluid medium in said housing, a driving member, a driven member, a shaft to which said driven member is fixed, said driven member being at least partially immersed in said fluid medium and having a bore, an outlet passage leading from said bore and an intake port, a portion of said outlet passage being formed in said shaft, opposed pistons in said bore, means carried by said driving member for actuating said pistons, valve means which is operable as said pistons move away from one another to permit a charge of said fluid medium to enter said bore and which is operable as said pistons move toward one another to permit said charge to enter said passage and means for controlling the flow of the fluid medium from said passage, whereby to regulate the speed of rotation of said driven member.

4. A mechanism of the character described including a housing, a fluid medium in said housing, a driving member, a driven member, one of said members having a plurality of bores and an outlet passage with which said bores communicate, opposed pistons in each of said bores, means carried by the other of said members for actuating said pistons, said means being operable to move the pistons in diametrically opposed bores simultaneously toward one another, the pistons in said bores thereafter being moved simultaneously away from one another, valve means which is operable as the pistons in said bores move away from one another to permit charges of said fluid medium to enter said bores and which is operable as said pistons move toward one another to permit said charges to enter said outlet passage and means for restricting the flow of the fluid medium from said passage, whereby to cause the driving member to rotate the driven member.

5. A mechanism of the character described including a housing, a fluid medium in said housing, a driving member, a driven member, said driven member having a plurality of bores and an outlet passage with which said bores communicate, opposed pistons in each of said bores, means carried by said driving member for actuating said pistons, said means being operable to move the pistons in diametrically opposed bores simultaneously toward one another, the pistons in said bores thereafter being moved simultaneously away from one another, valve means which is operable as the pistons in said bores move away from one another to permit charges of said fluid medium to enter said bores and which is operable as the pistons move toward one another to permit said charges to enter said passage and means for controlling the flow of the fluid medium from said passage, whereby to regulate the speed of rotation of said driven member.

6. A mechanism of the character described including a housing, a fluid medium in said housing, a driving member, a driven member, one of said members having a plurality of bores which are arranged in diametrically opposed pairs and an outlet passage with which said bores communicate, opposed pistons in each of said bores, means carried by the other of said members for actuating said pistons, said means being operable to move the pistons in one pair of said bores simultaneously toward one another as the pistons in a second pair of said bores are moving away from one another, valve means which is operable as the pistons in said second pair of bores move away from one another to permit charges of said fluid medium to enter said bores and which is operable as the pistons in said first mentioned pair of bores move toward one another to permit the charges of said fluid medium which have previously entered the said bores to pass therefrom and enter said passage and means for controlilng the flow of the fluid medium from said passage, whereby to regulate the speed of rotation of said driven member.

7. A mechanism of the character described including a housing, a fluid medium in said housing, a driving member, a driven member, said driven member having a plurality of bores which are arranged in diametrically opposed pairs and an outlet passage with which said bores communicate, opposed pistons in each of said bores, means carried by said driving member for actuating said pistons, said means being operable to move the pistons in one pair of said bores simultaneously toward one another as the pistons in a second pair of said bores are moving away from one another, valve means which is operable as the pistons in said second pair of bores move away from one another to permit charges of said fluid medium to enter said bores and which is operable as the pistons in said first mentioned pair of bores move toward one another to permit the charges of said fluid medium which have previously entered the said bores to pass therefrom and enter said passage and means for controlling the flow of the fluid medium from said passage whereby to regulate the speed of rotation of said driven member.

8. A mechanism of the character described including a housing, a fluid medium in said housing, a driving member, a driven member, one of said members having at least one bore and an outlet passage leading from said bore, a sleeve in said bore for providing a valve, opposed pistons in said sleeve, means carried by the other of said members for actuating said pistons, means for operating said sleeve so that during the suction strokes of said pistons a charge of the said fluid medium is caused to enter it, said last named means being operable to actuate said sleeve so that during the exhaust strokes of said pistons said charge is caused to enter said passage and means for controlling the flow of the fluid medium from said passage, whereby to regulate the speed of rotation of said driven member.

9. A mechanism of the character described including a housing, a fluid medium in said housing, a driving member, a driven member, said driven member having at least one bore and an outlet passage leading from said bore, a sleeve in said bore for providing a valve, opposed pistons in said sleeve, means carried by said driving member for actuating said pistons, means for operating said sleeve so that during movement of the pistons away from one another a charge of said fluid medium is caused to enter said sleeve, said last named means being operable to actuate said sleeve so that as said pistons move toward one another said charge is caused to enter said passage and means for controlling the flow of the fluid medium from said passage, whereby to regulate the speed of rotation of said driven member.

10. A mechanism of the character described including a housing, a fluid medium in said housing, a driving member, a driven member, said driven member having a plurality of bores which are arranged in diametrically opposed pairs and an outlet passage with which said bores communicate, a sleeve in each of said bores for providing a valve, opposed pistons in each of said sleeves, means carried by said driving member for actuating said pistons, said means being operable to move the pistons in one pair of said bores simultaneously toward one another as the pistons in a second pair of said bores are moving away from one another, means for operating the sleeves in said second pair of bores so that as the pistons therein are moving away from one another charges of said fluid medium are caused to enter said bores, means for operating the sleeves in said first mentioned pair of bores so that as the pistons therein move toward one another the charges of said fluid medium which have previously entered the said bores are caused to pass therefrom and enter said passage and means for controlling the flow of the fluid medium from said passage, whereby to regulate the speed of rotation of said driven member.

11. A mechanism of the character described including a housing, a fluid medium in said housing, a driving member, a driven member, said driven member having a plurality of bores and an outlet passage with which said bores communicate, opposed pistons in each of said bores, cams carried by said driving member for moving the pistons in said bores toward one another, springs in said bores for moving the said pistons away from one another, said cams being adapted to move the pistons in a diametrically opposed pair of said bores simultaneously toward one another, said pistons thereafter being moved simultaneously away from one another, valve means which is operable as the pistons in said pair of bores move away from one another to permit charges of said fluid medium to enter said bores and which is operable as the pistons move toward one another to permit said charges to enter said passage and means for controlling the flow of the fluid medium from said passage, whereby to regulate the speed of rotation of said driven member.

12. A mechanism of the character described including a housing, a fluid medium in said housing, a driving member, a driven member, said driven member having a plurality of bores and an outlet passage with which said bores communicate, opposed pistons in each of said bores, said driving member including spaced discs which are arranged at opposite sides of said driven member, means connecting said discs and securing them against relative angular movement, cams carried by said discs for moving the pistons in said bores toward one another, springs in said bores for moving said pistons away from one another, said cams being adapted to move the pistons in a diametrically opposed pair of said bores simultaneously toward one another, said pistons thereafter being moved simultaneously away from one another, valve means which is operable as the pistons in said pair of bores move away from one another to permit charges of said fluid medium to enter said bores and which is operable as the pistons move toward one another to permit said charges to enter said passage and means for controlling the flow of the fluid medium from said passage, whereby to regulate the speed of rotation of said driven member.

13. A mechanism of the character described including a housing, a fluid medium in said housing, a driving member, a driven member, said driven member having at least one bore and an outlet passage with which said bore communicates, a sleeve in said bore for providing a valve, opposed pistons in said sleeve, a gear fixed to said sleeve, said driving member including spaced discs which are arranged at opposite sides of said driven member, means connecting said discs and securing them against relative angular movement, cams carried by said discs for moving said pistons toward one another, a spring in said sleeve for moving said pistons away from one another, a second gear which is connected to said driving member and which meshes with said first mentioned gear, said gears rotating said sleeve so that as said pistons move away from one another a charge of said fluid medium is caused to enter it and rotating said sleeve so that as said pistons move toward one another said charge is caused to enter said passage and means for controlling the flow of the fluid medium from said passage, whereby to regulate the speed of rotation of said driven member.

14. A mechanism of the character described including a housing, a fluid medium in said housing, a driving member, a driven member, said driven member having a plurality of bores which are arranged in diametrically opposed pairs and an outlet passage with which said bores communicate, a sleeve in each of said bores for providing a valve, opposed pistons in each of said sleeves, a gear fixed to each of said sleeves, said driving member including spaced discs which are arranged at opposite sides of said driven member, means connecting said discs and securing them against relative angular movement, cams carried by said discs for moving the pistons in said bores toward one another, springs in said bores for moving said pistons away from one another, said cams being adapted to move the pistons in one pair of said bores simultaneously toward one another, a driving gear which is connected to said driving member and which meshes with the gears carried by said sleeves, said gears rotating the sleeves in said pair of bores so that as the pistons therein move away from one another charges of said fluid medium are caused to enter said bores and rotating said sleeves so that as said pistons move toward one another said charges are caused to enter said passage and means for controlling the flow of the fluid medium from said passage, whereby to regulate the speed of rotation of said driven member.

15. A mechanism of the character described including a housing, a fluid medium in said housing, a driving member, a driven member, a shell which incases said driving and driven members and which is partially immersed in said fluid medium, said shell having an inlet opening formed along its under side, one of said members having a bore and an outlet passage with which said bore communicates, at least one piston in said bore, means carried by the other of said members for actuating said piston, valve means which is operable during one stroke of said piston to permit a charge of said fluid medium to enter said bore and which is operable during the succeeding stroke of said piston to permit said charge to enter said passage, said driving member being operative as it rotates to cause the fluid medium in said housing to enter said inlet opening until an annular body of it is circulating in said shell and means for controlling the flow of the fluid medium from said passage, whereby to regulate the speed of rotation of said driven member.

16. A mechanism of the character described including a housing, a fluid medium in said housing, a driving member, a driven member, a shell which incases said driving and driven members and which is partially immersed in said fluid medium, said shell having an inlet opening formed along its under side, said driven member having a bore and an outlet passage with which said bore communicates, opposed pistons in said bore, means carried by said driving member for actuating said pistons, valve means which is operable as said pistons move away from one another to permit a charge of said fluid medium to enter said bore and which is operable as said pistons move toward one another to permit said charge to enter said passage, said driving member being operative as it rotates to cause the fluid medium in said housing to enter said inlet opening until a body of it is circulating in said shell and means for controlling the flow of said fluid medium from said passage, whereby to regulate the speed of rotation of said driven member.

17. A mechanism of the character described including a housing, a fluid medium in said housing, a driving member, a driven member, a shell which incases said driving and driven members and which is partially immersed in said fluid medium, said shell having an inlet opening formed along its under side, said driven member having a bore and an outlet passage with which said bore communicates, opposed pistons in said bore, means carried by said driving member for actuating said pistons, valve means which is operable as said pistons move away from one another to permit a charge of said motive fluid to enter said bore and which is operable as said pistons move toward one another to permit said charge to enter said passage, said driving member being operative as it rotates to cause the fluid medium in said housing to enter said inlet opening until a body of it is circulating in said shell, a deflector carried by said shell, said deflector extending across said inlet opening in the direction of rotation of said driving member and being angularly inclined toward said member and means for controlling the flow of said fluid medium from said passage, whereby to regulate the speed of rotation of said driven member.

18. A mechanism of the character described including a housing, a fluid medium in said housing, a driving member, a driven member, said driving member having a hollow cylindrical body which is co-axial with said driven member, a shell which incases said driving and driven members and which is partially immersed in said fluid medium, said shell having an inlet opening formed along its under side, said driven member having a bore and an outlet passage with which said bore communicates, at least one piston in said bore, means carried by said driving member for actuating said piston, valve means which is operable as said piston moves in one direction to permit a charge of said fluid medium to enter said bore and which is operable as said piston moves in the opposite direction to permit said charge to enter said passage, said driving member being operative as it rotates to cause the fluid medium in said housing to enter said inlet opening until a body of it is circulating in said shell, the body of said driving member being formed with a longitudinally extending opening through which the fluid medium is caused to enter, a deflector carried by said body for directing the fluid medium against said driven member and means for controlling the flow of the fluid medium from said passage, whereby to regulate the speed of rotation of said driven member.

19. A mechanism of the character described including a housing, a fluid medium in said housing, a driving member, a driven member, said driving member having a hollow cylindrical body which is co-axial with said driven member, a shell which incases said driving and driven members and which is partially immersed in said fluid medium, said shell having an inlet opening formed along its under side, said driven member having a bore and an outlet passage with which said bore communicates, at least one piston in said bore, means carried by said driving member for actuating said piston, valve means which is operable as said piston moves in one direction to permit a charge of said fluid medium to enter said bore and which is operable as said piston moves in the opposite direction to permit said charge to enter said passage, said driving member being operative as it rotates to cause the fluid medium in said housing to enter said inlet opening until a body of it is circulating in said shell, a deflector carried by said shell, said deflector extending across said inlet opening in the direction of rotation of said driving member and being angularly inclined toward said member, the body of said driving member being formed with a longitudinally extending opening through which the fluid medium enters, a deflector carried by said body for directing said fluid medium which enters said opening against said driven member and means for controlling the flow of said fluid medium from said passage, whereby to regulate the speed of rotation of said driven member.

20. A mechanism of the character described including a housing, a fluid medium in said housing, a driving member, a driven member, said driving member having a hollow cylindrical body which is co-axial with said driven member, a shell which incases said driving and driven members and which is partially immersed in said fluid medium, said shell having an inlet opening formed along its under side, said driven member having diametrically opposed bores and an outlet passage with which said bores communicate, opposed pistons in each of said bores, means carried by said driving member for moving the pistons in each of said bores simultaneously toward one another, the pistons in said bores thereafter being moved simultaneously away from one another, valve means which is operable as the pistons in said bores move away from one another to permit charges of said fluid medium to enter said bores and which is operable as said pistons move toward one another to permit said charges to enter said passage, said driving member being operative as it rotates to cause the fluid medium in said housing to enter said inlet opening until a body of it is circulating in said shell, a deflector carried by said shell, said deflector extending across said inlet opening in the direction of rotation of said driving member and being angularly inclined toward said member, the body of said driving member being formed with opposed longitudinally extending openings through which the fluid medium enters, diametrically disposed deflectors carried by said body for directing the fluid medium which enters said openings against said driven member and means for controlling the flow of said fluid medium from said passage, whereby to regulate the speed of rotation of said driven member.

21. A mechanism of the character described including a housing, a fluid medium in said housing, a driving member, a driven member, a driven shaft to which said driven member is fixed, said driven member having a plurality of bores which are arranged in diametrically opposed pairs and a chamber with which said bores communicate, said driven shaft having a hollow section which provides a passage which communicates with said chamber, opposed pistons in each of said bores, means carried by said driving member for actuating said pistons, said means being operable to move the pistons in one pair of said bores simultaneously toward one another as the pistons in a second pair of said bores are moving away from one another, valve means which is operable as the pistons in said second pair of bores move away from one another to permit charges of said fluid medium to enter said bores and which is operable as the pistons in said first mentioned pair of bores move toward one another to permit the charges of said fluid medium which have previously entered said bores to pass therefrom and enter said chamber, the hollow section of said driven shaft being formed with at least one opening through which the fluid medium is discharged from said passage and a sleeve which fits on the hollow section of said driven shaft and which is movable axially thereon to cover said opening to restrict the flow of the fluid medium from said passage, whereby to cause said driving member to rotate said driven member.

22. A mechanism of the character described including a housing, a fluid medium in said housing, a driving member, a driven member, said driven member having a plurality of bores and an outlet passage with which said bores communicate, opposed pistons in each of said bores, said driving member including spaced discs which are arranged at opposite sides of said driven member, means connecting said discs and securing them against relative angular movement, cams carried by said discs for moving the pistons in said bores toward one another, springs in said bores for moving said pistons away from one another, said cams being adapted to move the pistons in a diametrically opposed pair of said bores simultaneously away from one another, valve means which is operable as the pistons in said pair of bores move away from one another to permit charges of said fluid medium to enter said bores and which is operable as the pistons move toward one another to permit said charges to enter said passage, means for controlling the flow of the fluid medium from said passage, whereby to regulate the speed of rotation of said driven member and means for varying the axial distance between said discs.

WILLIAM L. WETTLAUFER.